INVENTOR.
SARKIS NERCESSIAN
BY
Alfred W. Barber
ATTORNEY

INVENTOR.
SARKIS NERCESSIAN
BY
Alfred W. Barber
ATTORNEY

INVENTOR.
SARKIS NERCESSIAN
BY
Alfred W. Barber
ATTORNEY

INVENTOR.
SARKIS NERCESSIAN
BY
Alfred W. Barber
ATTORNEY

United States Patent Office 3,495,157
Patented Feb. 10, 1970

3,495,157

PREVENTING TURN-OFF OVERSHOOT IN REGULATED POWER SUPPLIES EMPLOYING FEEDBACK REGULATION

Sarkis Nercessian, Long Island City, N.Y., assignor to Forbro Design Corp., New York, N.Y., a corporation of New York Filed June 22, 1967, Ser. No. 648,086
Int. Cl. G05f *1/10;* H02j *1/04, 3/10*
U.S. Cl. 323—9 10 Claims

ABSTRACT OF THE DISCLOSURE

Turn-off overshoot in a regulated power supply is prevented by simultaneously cutting off the error amplifier and reverse biasing the pass transistors effectively preventing further output after the power supply is turned off.

BACKGROUND OF THE INVENTION

Field of the invention

The present invention pertains to means for preventing overshoot of the output voltage or current in a regulated power supply employing degenerative regulating means, upon interruption or turning off of the input power to the power supply.

Description of the prior art

In the past attempts to prevent overshoot due to the interruption or turning off of the input power have been made. One such device includes a high power dissipation resistor which is shunted across the power supply output by means of a relay which closes in response to the interruption of the input power. This resistor is intended to discharge the output capacitor of the power supply and hold down any tendency to overshoot.

SUMMARY

The present invention concerns voltage and current regulated power supplies employing two control amplifiers, one for voltage regulation and the other for current regulation. The voltage control amplifier compares a sample of the output voltage with a reference voltage while the current control amplifier compares a sample of the output current with a reference. Regulation of the output of the power supply is accomplished by means of a signal responsive pass device such as a transistor or a vacuum tube. The output signals of the two amplifiers are applied to the signal control element of the pass device through an OR gate which passes only the larger of the two output signals from the amplifiers.

The present invention provides a circuit means for cutting off the pass device when the amplifiers lose control due to lack of sufficient bias voltage. This condition takes place when the power supply input power is interrupted as on turn-off. Additional provisions of the present invention include indicators for showing the regulating mode (current or voltage) and a thermal switch cutout for over temperature protection.

Stated another way, the control signal path including any amplifiers between the outputs of the two amplifiers and the control element of the pass device is back-biased in the absence of forward drive from one of the amplifiers. Thus, if the amplifiers lose control, the pass device is cut-off. This action has been found to insure that the output of the power supply will not overshoot i.e. will never increase above the current or voltage called for by the current and voltage control amplifiers.

Accordingly, one object of the present invention is to provide methods of and means for shutting down a voltage/current regulated power supply without producing an overvoltage or overcurrent surge in the output.

Another object is to provide a method of and means for shutting down a voltage/current regulated power supply in accordance with a predetermined sequence so that no overshoot is produced in the output circuit.

Still another object is to provide such shut down without overshoot in response to a thermal overload in the power supply.

A further object is to provide an improved voltage/current mode indicator in a power supply in accordance with the present invention.

These and other objects will be apparent from the detailed description of the present invention given in the specification in the detailed description of the drawings.

DESCRIPTION OF THE PREFERRED EMBODIMENTS

Figure 1:
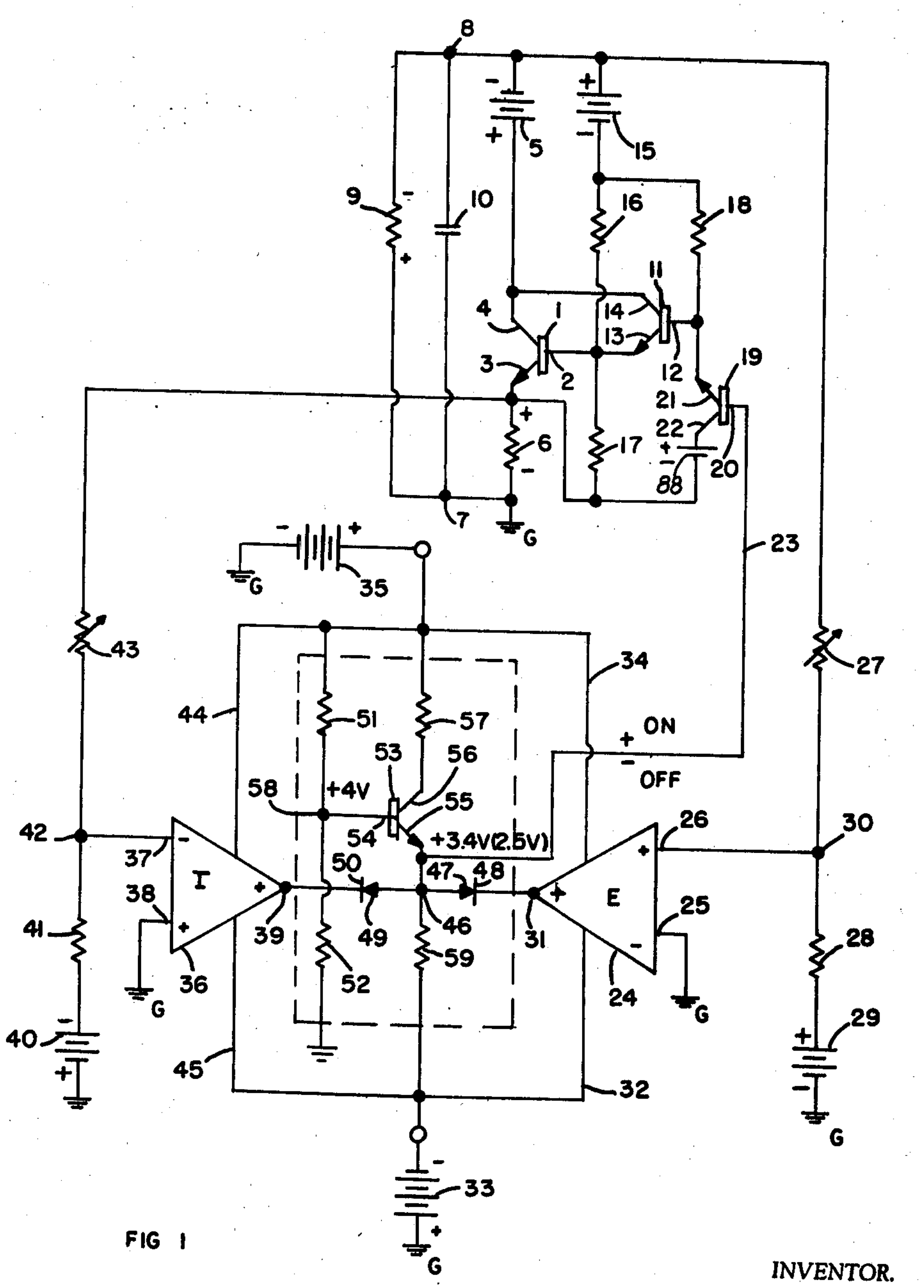
FIGURE 1 is a schematic circuit diagram of one form of the present invention as applied to a voltage/current regulated power supply using NPN bipolar transistor pass devices.

FIGURE 1 is a schematic circuit diagram of a voltage/current regulated power supply using NPN pass transistor 1 to control the power passing from an unregulated source represented by battery 5 to a load 9 connected across load terminals 7 and 8. Transistor 1 has a base 2, emitter 3 and collector 4. Collector 4 is connected to the positive side of unregulated source 5. The negative side of unregulated source 5 is connected to load terminal 8. Emitter 3 is connected through current sensing resistor 6 to load terminal 7. Load terminal 7 is also grounded at G. The indicated ground points labeled G are intended to show common points of the circuit. Actual chassis ground is generally made to one side of the load 9. The voltage or current to load 9 is controlled by controlling the base current to base 2. Generally a capacitor such as capacitor 10 will be provided across output terminals 7 and 8.

The first control on base 2 is provided by driver transistor 11 provided with base 12, emitter 13 and collector 14. Transistor 11 is connected as an emitter follower current drive with emitter 13 connected to base 2. Collector 14 is connected to the positive side of unregulated source 5 for its source of DC collector voltage. In order to insure that transistor 1 can be cut-off when desired, a source of negative bias is provided as represented by battery 15. The negative side of cut-off bias 15 is applied to base 2 through resistor 16 and across resistor 17. Any slight conduction in transistor 11 which may exist when the control signals call for zero conduction in transistor 1 is off-set by the bias on base 2 from this bias source 15. Cut-off bias source 15 is also applied to cut-off transistor 11 in the absence of a signal calling for conduction in transistor 1 by connecting the negative side of source 15 through resistor 18 to base 12. A further pre-drive is provided by transistor 19 having base 20, emitter 21 and collector 22 connected in a common collector circuit. Base 20 is connected to control signal line 23 from which it receives command signals, as will be described in detail below. Collector 22 is returned to positive side of the battery 88. The negative side of the battery 88 is connected at the positive side of the current sensing resistor 6. Emitter 21 is connected to base 12 to which it supplies drive current under control of signals from control line 23. Thus, control signals from line 23 control the conduction of transistor 19 which in turn controls conduction of transistor 11 which again in turn controls the conduction of pass transistor 1. While the pass transistor, driver and predriver transistors have been shown comprising a three transistor cascaded circuit other configurations may be used.

It will be seen that the circuit as decribed so far insures cut-off of the pass transistor 1 whenever the signal on control line 23 goes to zero or negative with respect to ground G. This cut-off takes place with line 23 negative due to the back-bias of source 15 on bases 12 and 2 as described above. Below will be described how, in accordance with the present invention, it is insured that line 23 goes negative whenever the power supply is turned off. It will be seen that no overshoot can take place if line 23 goes negative on turn-off in the presence of the back bias provisions on bases 12 and 2 as described in detail above.

The more important aspects of the present invention will now be described. The present invention will be described, in particular, as applied to a regulating circuit as set forth in U.S. Patent No. 3,028,538 and voltage/current regulation using two amplifiers, one for voltage regulation and the other for current regulation, as set forth in U.S. Patent No. 3,305,763.

FIGURE 1 shows a voltage regulating circuit using a high gain operational amplifier 24 including an non-inverting input terminal 26, an inverting input terminal 25 and an output terminal 31. Amplifier 24 is provided with a positive voltage supply over lead 34 from a suitable source represented by battery 35 and with a negative voltage supply over lead 32 from a suitable source represented by battery 33. Generally, amplifier 24 will be a differential amplifier although the present invention is applicable to other suitable amplifiers which may be used for the voltage regulation. The input to non-inverting input terminal 26 is derived from two current sources; one provided by a suitable reference voltage source represented by battery 29 which supplies a predetermined reference current as determined by the ratio of the voltage of source 29 to the resistance of reference resistor 28 to summing junction 30 (connected to non-inverting input terminal 26). A second current in the opposite direction is supplied from the voltage across load 9 at output terminal 8 through output voltage control resistor 27 to summing point 30. This second current is equal to the output or load voltage across terminals 7 and 8 divided by the resistance of resistor 27. The voltage regulation as will be described in more detail below is such that the load voltage is regulated to a value which makes the two currents at summing point 30 equal. It will be seen that under these operating conditions, the output or load voltage may be changed to any desired value and will regulate at this desired value by appropriately changing the value of resistor 27. (The output voltage can also be changed by changing the value of resistor 28 or the voltage of reference voltage 29).

FIGURE 1 also includes a current regulating circuit using a operation amplifier 36 having an inverting input terminal 37, a non-inverting input terminal 38 and an output terminal 39. Positive supply voltage is applied to amplifier 36 over lead 44 from source 35 and negative supply voltage is applied over lead 45 from source 33. The current regulating circuit using amplifier 36 is similar to the voltage regulating circuit using amplifier 24 and described in detail above. A reference current is supplied from a voltage source 40 through reference resistor 41 to summing point 42 connected to inverting input terminal 37. The value of this current is the voltage of source 40 divided by the resistance of resistor 41. A second current is applied to summing terminal 42 from the voltage drop across current sensing resistor 6 through current control resistor 43. Since the current to load 9 passes through current sensing resistor 6, the voltage drop across it will be proportional to the load current. The current supplied to the summing point 42 is equal to the voltage drop across resistor 6 divided by the resistance of resistor 43. The current control circuit including amplifier 36 regulates so that the reference current is equalled by the current fed back from the voltage drop across the current sensing resistor. Thus, the load current is determined and may be changed by changing the value of current control resistor 43. (The load current can also be changed by changing the value of resistor 41 or the voltage of reference voltage 40.)

The more significant circuitry in accordance with the present invention is concerned with the treatment of the output voltages of amplifiers 24 and 36 as shown in FIG. 1. It will be seen that the control as provided by transistors 1, 11 and 19 is such that these transistors will conduct and supply voltage and current to load 9 generally when the voltage on line 23 is positive and that these transistors will be cut-off and supply no voltage or current to the load generally when the voltage on line 23 is negative with respect to ground G or terminal 7. In order to provide the desired control and the desired cut-off to prevent over-shoot in accordance with the present invention transistor 53, diodes 47–48 and 49–50 and associated circuitry is provided. First resistors 51 and 52 are connected in series from the positive side of voltage source 35 to ground G and are so chosen in value that their junction point 58 sits at a small positive voltage of the order of 4 volts. Transistor 53 includes base 54, emitter 55 and collector 56. Collector 56 is connected to the positive side of voltage source 35 through resistor 57 and emitter 55 is connected to the negative side of voltage source 33 through resistor 59. Resistor 57 is chosen to be of smaller resistance value than resistor 59 so that when transistor 53 is conducting, emitter 55 assumes a voltage closer to the voltage of the positive side of source 35 than to the voltage of the negative side of source 33.

In this way, with base 54 at say plus 4 volts, emitter 55 will sit at a small positive voltage of the order of plus 3.4 volts. Since it takes only a small positive voltage on line 23 to turn on full voltage and current to the load 9, this plus 3.4 volts is sufficient to produce full conduction in the pass transistor 1. Now, the regulators including amplifiers 24 and 36 and their associated circuitry will call for less voltage and current to load 9 which means that the outputs of these amplifiers at terminals 31 and 39 will try to pull down the voltage on line 23 to a less positive value. With terminals 31 and 39 less positive than line 23, these terminals will, in other words, be negative with respect to junction point 46 connected to line 23 and one of diodes 47–48 and 49–50 will conduct. If the system is in its voltage regulating mode, terminal 31 will not only be negative with respect to junction 46 but will also be negative with respect to terminal 39 and will thus control the voltage on line 23 and hence, will control the pass transistor 1 and the voltage across load terminals 7 and 8 and load 9. Now, if the system is placed in current regulating mode as by changing the value of resistor 43, the voltage at terminal 39 will become lower than the voltage at terminal 31 and will control line 23 and hence, transistor 1 and the current to load termianls 7 and 8 and load 9. The changeover from voltage regulation to current regulation or current regulation to voltage regulation takes place with minute differences in the feedback signals through resistor 27 or resistor 43 due to the very high gain provided by amplifiers 24 and 36. Typically these operational amplifiers will have open loop voltage gains of 50,000 to over 1,000,000. Thus, the switching through diodes 47–48 and 49–50 is very sharp and its sharpness depends on the open loop gains of amplifiers 24 and 36. In either current or voltage regulating modes line 23 (junction 46) operates at a small positive voltage of the order of plus 2.5 volts.

In order to understand the operation of the present invention, consider what happens when the various voltage sources are turned off. While voltage sources 5, 15, 35, 33, 29, 40 and 88 are shown as batteries, it will be understood that in an actual power supply to which the present invention applies, these voltage sources are supplied by rectifier-filter circuits from a common alternating current power line or source. When this power is turned off or interrupted, all of the voltages of these various sources start to decay. In particular, sources 33 and 35 since they supply light loads relative to the main output load supplied by source 5, decay faster than source 5. Turning off or interrupting the power of the supply can be considered equivalent to a large AC input line change. Normally for an input step down from 125 v. to 105 v. AC., the amplifiers act by increasing respectively their positive outputs which in turn increases the conduction of the pass elements. Therefore the error amplifiers will try to maintain or even increase the positive potential at point 46. But, when the power is turned off (large input step) or interrupted point 58 (base 54 of the NPN transistor 53) starts to go to ground while the point 46 (emitter 55 of the NPN transistor 53) is going positive, causing transistor 53 to go out of conduction. With transistor 53 not conducting point 46 and hence line 23 is pulled quickly to negative by source 33 acting through resistor 59. Also both diodes 47–48 and 49–50 are pulled out of conduction disconnecting the error amplifiers from control circuit. When line 23 goes negative, transistors 1, 11 and 19 are pulled out of conduction preventing any voltage or current from source 5 reaching the load terminals 7 and 8 or load 9 even though the voltage across source 5 does not decay as fast as source 33 or any of the other sources. The cut-off of transistor 1 is further insured by the cut-off bias from source 15 applied to bases 2 and 12 through resistors 16 and 18 respectively and by the final potential (zero volt) at point 46. It is this cut-off action of all of the cut-off supplies, or anyone of them, and particularly that of source 33 which insures that the power supply will not overshoot when the alternating current power source is turned off or interrupted.

Figure 2:
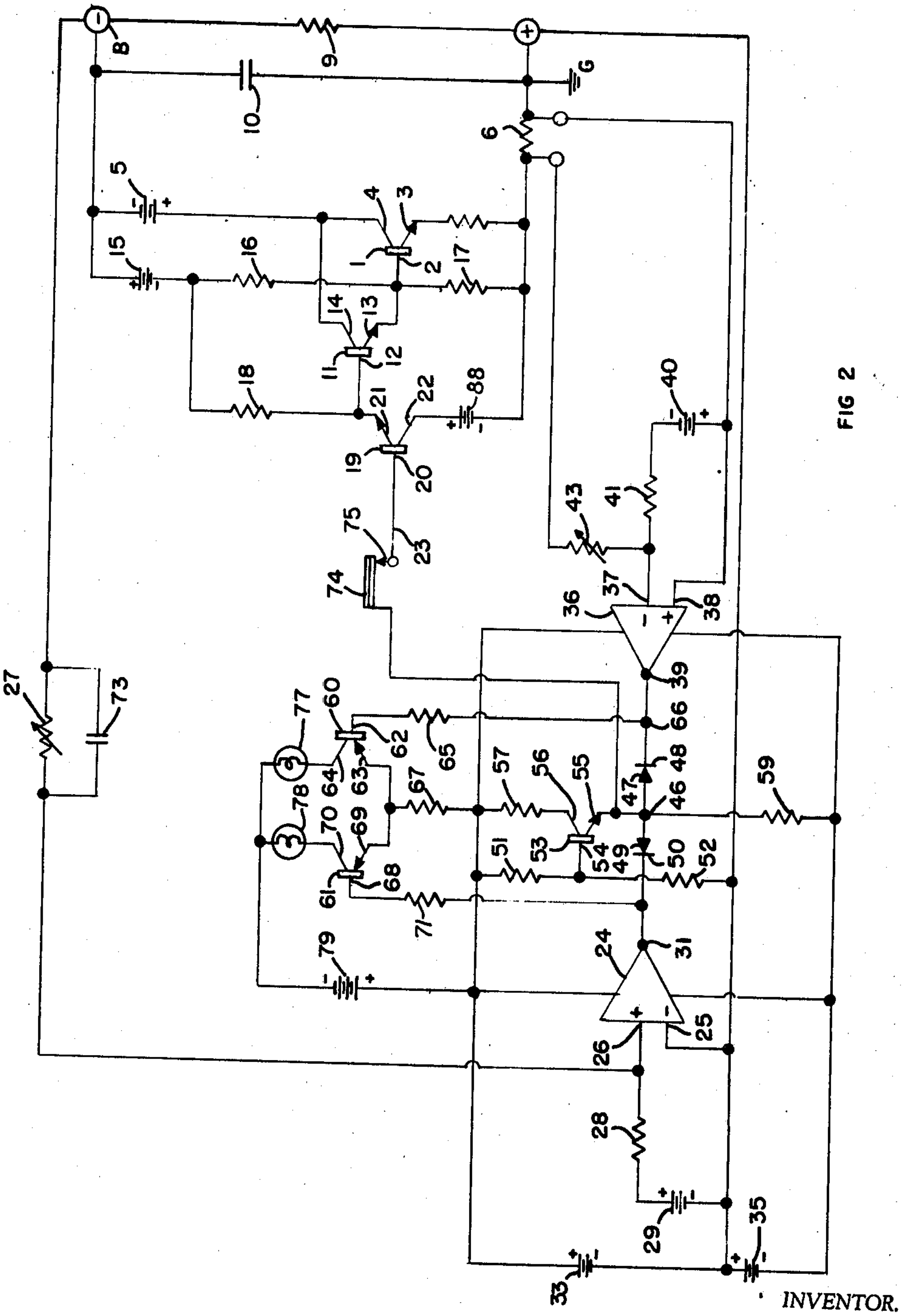
FIGURE 2 is a schematic circuit diagram of a modified form of the present invention similar to the form shown in FIG. 1 and including a thermoswitch and voltage/current mode indicating lamps.

FIGURE 2 is a schematic circuit diagram of a regulated power supply similar to the one shown in FIGURE 1 and this similarity is indicated where ever the same component numbers are used on corresponding components. However, this circuit includes two additional functional configurations. One of these is a thermo cut-out switch operating to protect the power supply in case of over heating; and the second, is mode indicating means coupled to the current and voltage control amplifiers respectively. The thermoswitch comprises means for opening a circuit in the case of thermal overload. A bimetallic switch such as 74–75 is thermally coupled to the point or part of the circuit to be monitored for over temperature. The normally closed contact 75 maintains the circuit in lead 23 for all temperatures below the predetermined temperature of protection. If the temperature is sensed by the thermal switch 74–75 rises above the predetermined temperature contact 75 opens removing the drive current from line 23 and therefore from base 20 of transistor 19 thereby cutting off the output of the power supply. With base 20 open the back bias voltage described above and associated with transistors 1, 11 and 19 come into operation thereby effectively reducing the output current to the low terminals 7 and 8 to zero.

FIGURE 2 also shows how mode indicators 77 and 78 may be connected with the power supply circuit. Indicators 77 and 78 may be any suitable type of indicator for the purpose, such as incandescent lamps. These indicators are driven by a differential pair of transistors 60–61. Transistor 60 includes a base 62, and an emitter 63, and a collector 64 and transistor 61 includes a base 68, and emitter 69, and a collector 70. Emitters 63 and 69 are connected together and through a common emitter resistor 67 to the positive bias source 33. Collector 64 is connected through indicator 77 to a suitable source of bias 79 and collector 70 is connected through indicator 78 to the same bias source. It will be recognized in a differential circuit of this type one transistor always conducts much more heavily than the other so that only one of indicator 70 and 78 will be energized at a given time. Base 62 is connected to junction point 66 through base resistor 65 so that the output of amplifier 36 is applied to base 62. Base 68 is connected to output 31 of amplifier 24 through base resistor 71 with a symmetrical circuit and the connections described above which ever of amplifiers 36 and 24 is supplying the controlling output to the power supply over lead 23 will supply the controlling negative voltage to bases 62 and 68. Thus, if the power supply is in current regulating mode the output of amplifier 36 will be more ngative than the output of amplifier 24 and transistor 60 will be rendered conducting causing current indicator 77 to show that the power supply is in current mode. In a similar manner if the power supply is in voltage regulating mode, the output of amplifier 24 will be more negative than the output of amplifier 36 and transistor 61 will be conducting causing voltage mode indicator 78 to indicate that the power supply is in voltage regulating mode. It would be appreciated that with high gain amplifiers 24 and 36 the switching of control between current and voltage is very sharp and correspondingly, the mode indicators will switch with hair trigger sensitivity.

Figure 3:
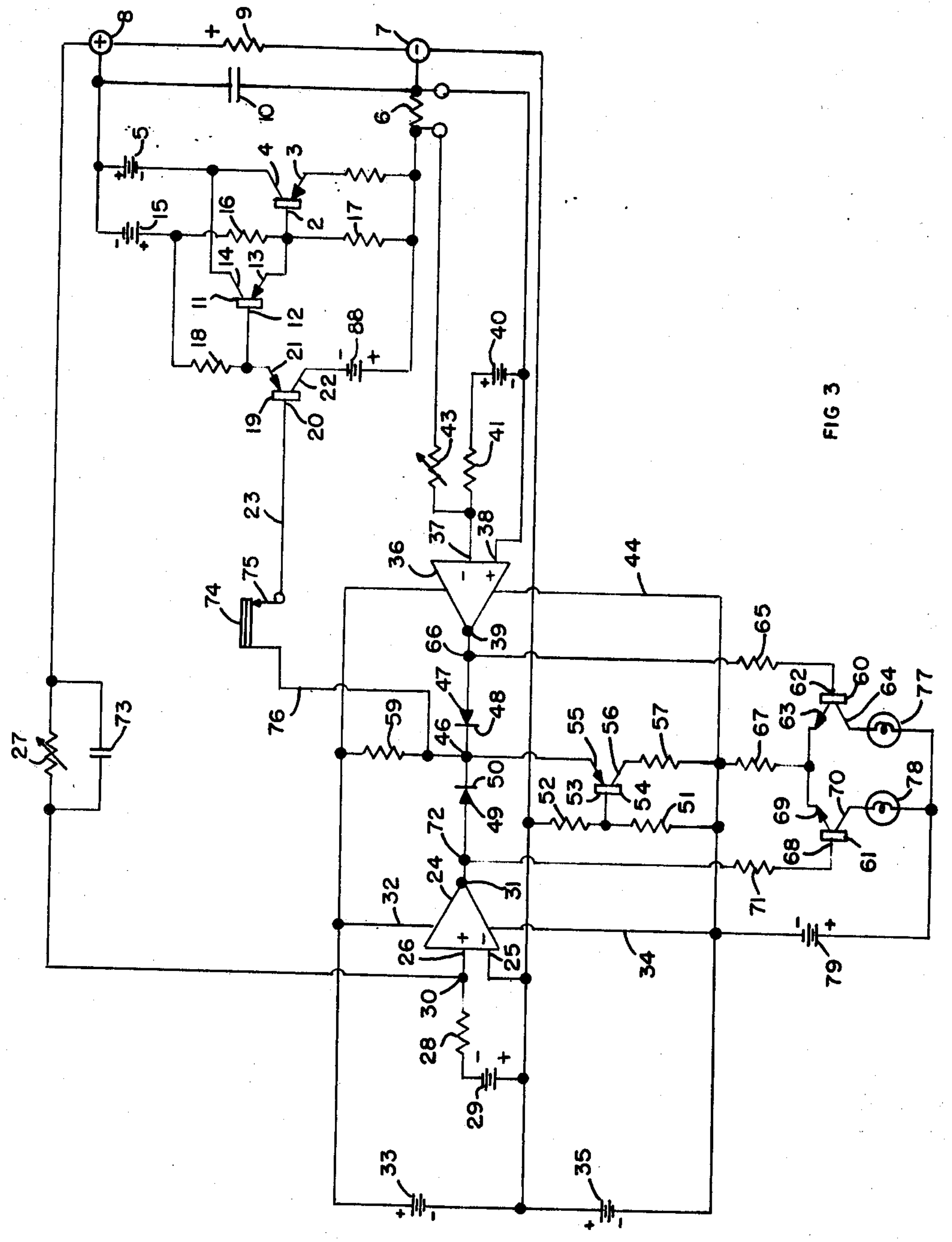
FIGURE 3 is a schematic circuit diagram of a form of the invention similar to that shown in FIG. 2 but adapted to use PNP transistor pass devices.

FIGURE 3 shows a regulated power supply circuit in accordance with the present invention and similar to the one shown in FIGURE 2 wherein corresponding circuit elements carry the same numerals with the exception that in FIGURE 3 the transistor types have been changed from NPN to PNP. This change of transistor type is accomplished by reversing all bias polarities as well as the direction of connection of diodes 49–50 and 48–47. Other than these changes to accommodate the different transistor type the circuit functions in general and in detail exactly as described in connection with FIGURE 2 above.

Figure 4:
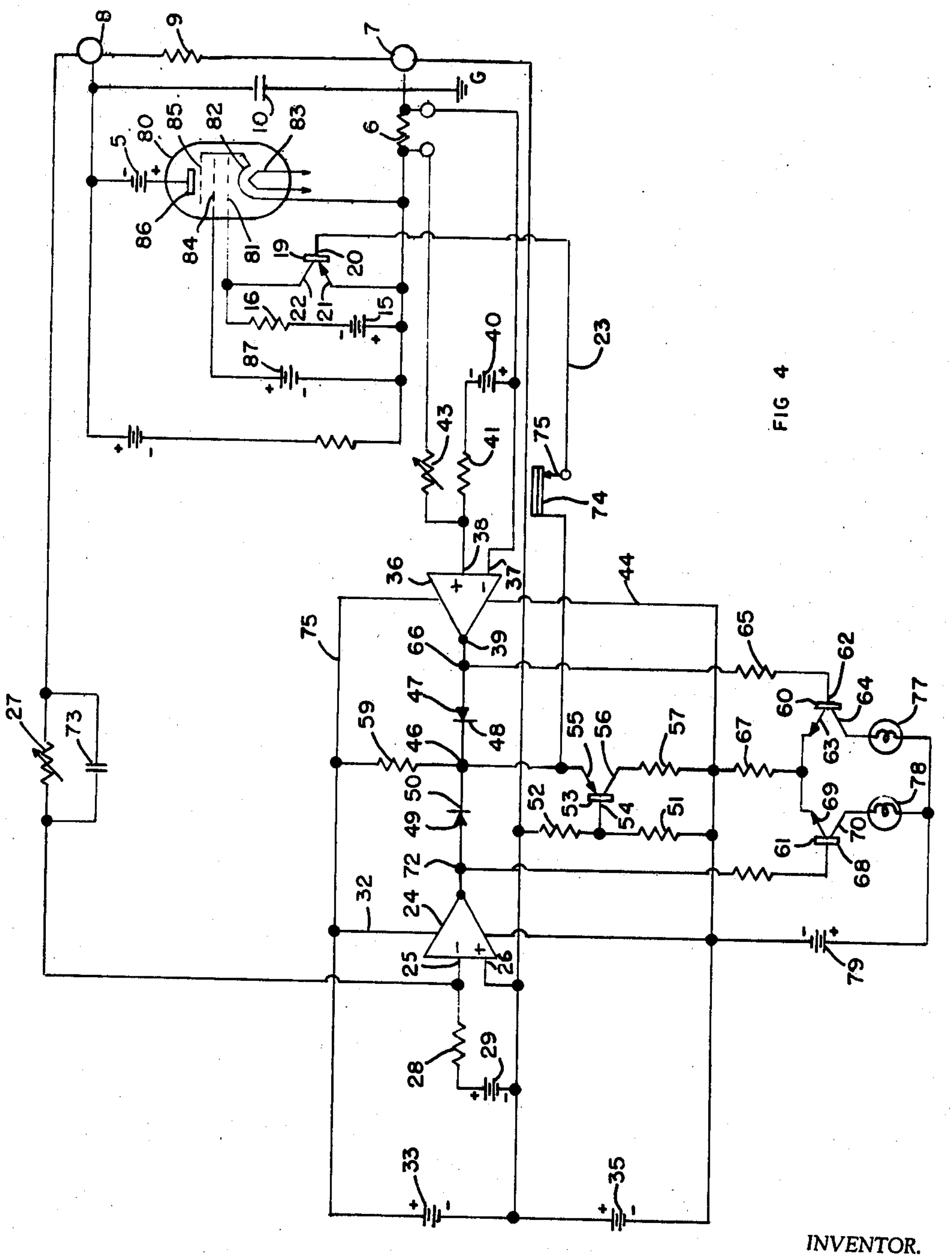
FIGURE 4 is a schematic circuit diagram of a form of the invention similar to that shown in FIG. 2 but adapted to use vacuum tube pass devices.

FIGURE 4 shows how the present invention may be used in a hybrid circuit, that is, in a circuit using a transistor amplifier and a vacuum tube pass element. Generally, the circuitry required for a hybrid regulated power supply is essentially the same as that required for a power supply using a pass transistor. But, because the output of the amplifier drives the grid of the vacuum tube which operates normally with relatively large negative potential, it is necessary to add a voltage amplifier stage with a large output voltage swing capability, and operating at quiescent point on the order of −20 volts. Such a transistor amplifier stage will introduce an inversion. Therefore inverting input 25 for voltage amplifier 24, and non-inverting input 38 for current amplifier 36 is used. Also the diode OR gate circuit, the overshoot protective circuit and mode indicator circuit is connected similarly with the PNP type power supply described in FIGURE 3. Circuit changes required for the hybrid circuit are also those closely associated with pass tube 80. The pass tube 80 may be any suitable vacuum tube as, for example, a high voltage pentode. Pentode tube 80 includes a cathode 82 heated by a heater 83 connected to a suitable power source, not shown. A control grid 81, screen grid 84, suppressor grid 85, and plate anode 86. Cathode 82 is returned to output terminal 7 through current sensing resistor 6. Anode 86 is connected to the positive side of the main power source 5 the negative end which is connected directly to output terminal 8. Suppressor grid 85 is connected directly to cathode 82. Screen grid 84 is connected to the positive side of a suitable bias source 87. Control grid 81 is connected through resistor 16 to the negative side of bias source 15. Driver transistor 19 is connected with base 20 supplied with input signals over line 23, emitter 21 connected to cathode 82 and collector 22 connected to control grid 81. Thus, when transistor 19 is nonconducting as, for example, when no input signal is being received calling for output power or when switch contact 75 is opened the full voltage of bias source 15 is applied directly through resistor 16 to control grid 81. Bias source 15 is chosen to be of sufficiently high voltage to cut off tube 80 under these conditions thereby supplying no current to output terminals 7 and 8. When signals are received on base 20 over line 23 calling for output power output voltage or current transistor 19 is rendered variably conductive causing a drop of voltage in resistor 16 so that the bias on grid 81 is reduced causing tube 80 to conduct and supply current to the output terminals 7 and 8. The mount of conduction and hence the amount of current supplied to the output terminals is regulated by the feedback through resistor 27. In the same general way as has been described for the regulated power supply circuit described in detail in connection with FIGURE 1 above. It will be seen that while the pass element of this circuit is a vacuum tube, all of the functions and features of the present invention are operative in the same way as described above particularly in connection with FIGURE 1. There is one difference due to the fact that a vacuum tube does not have the leakage current problem of a transistor the intermediate cut-off bias provision associated with base 2 of FIGURE 1 is not required. In order to insure no over shoot on turn-off in this hybrid circuit it is only necessary to insure that transistor 19 be cut-off at the proper time as described above.

The terms used in the claims are defined as follows:

"Automatic cross-over voltage/current regulated power supply" is a regulated power supply embodying both voltage regulation and current regulation with means for automatically transferring control from one mode to the other, i.e., from voltage regulation to current regulation and vice versa.

"Source of direct current to be regulated" may be any source of direct current regulated, partly regulated or unregulated which is to be voltage or current regulated in accordance with the present invention.

"Pair of output terminals" are the output points of the voltage/current regulated power supply.

"Current control device including control signal responsive means" is a control device which is capable of regulating the output voltage or current of the power supply in response to a signal applied to its control signal responsive means. This device responds to forward bias to permit DC current to flow from the direct current source to the output terminals. This device has the ability to cut-off or substantially cut-off this current flow in response to a reverse bias applied to its control signal responsive means. The conductivity of this device is controlled by forward bias and rendered substantially nonconducting by reverse bias.

"Signal mixing point" is a common junction to which various signals are applied.

"Unidirectional coupling means" is a device which conducts in one direction and substantially cuts-off in the other. A diode is a typical unidirectional coupling means.

"Thermostat" or "thermostat switch" are devices which actuate a circuit closure or switch in response to heat. A "normally closed thermostat" comprises a switch which is normally closed but which opens in the presence of a predetermined heat level or temperature.

"Operational amplifier" is an amplifier which amplifies direct current, has substantial gain, inverts the phase or polarity of the input at its output, and is designed to be stable when substantial amounts of feedback are applied from its output to its inverting input.

I claim:

1. In an automatic cross-over voltage/current regulated power supply, the combination of;

a source of direct current (5) to be regulated;

a pair of output terminals (7 and 8) for receiving the regulated current;

a current control device (1) including control signal responsive means (2) connected in series with current sensing means, said source of direct current and said output terminals for controlling the current flow from said current source to said output terminals wherein said current control device is characterized by variable conduction characteristics in response to forward bias signals applied to said control signal responsive means and substantial cut-off characteristics in response to reverse bias signals applied to said control signal responsive means;

a signal mixing point (46) coupled to said control signal responsive means whereby forward bias and reverse bias signals applied to said mixing point are conveyed to said control signal responsive means to control the conduction and cut-off condition of said current control device;

first amplifier means (24) including input means (25–26) and output means (31) adapted to provide control signals for controlling the voltage across said output terminals;

second amplifier means (36) including input means (37–38) and output means (39) adapted to provide control signals for controlling the current to said output terminals;

means (51 through 58) for supplying a cut-off bias to said mixing point (46);

a first unidirectional coupling means (47–48) connected between said output means of said first amplifying means and said mixing point;

a second unidirectional coupling means (49–50) connected between said output means of said second amplifying means and said mixing point;

wherein the latter two said unidirectional coupling means are connected in a direction to conduct forward bias polarity signals from said two amplifier means to said mixing point for controlling the conductivity of said current control device and whereby in the absence of forward bias signals from said amplifier means said cut-off bias means renders said current control device substantially non-conducting.

2. An automatic cross-over voltage/current regulated power supply as set forth in claim 1;

and including amplifying means connected between said signal mixing point and said control signal responsive means.

3. An automatic cross-over voltage/current regulated power supply as set forth in claim 1;

and including a source of reverse bias coupled to said control signal responsive means.

4. An automatic cross-over voltage/current regulated power supply as set forth in claim 1;

and including amplifying means connected between said signal mixing point and said control signal responsive means, and a source of reverse bias coupled to said amplifying means.

5. An automatic cross-over voltage/current regulated power supply as set forth in claim 1;

and including a normally closed thermostat connected in series between said signal mixing point and said control signal responsive means.

6. An automatic cross-over voltage/current regulated power supply as set forth in claim 1;

and including regulating mode indicators coupled to the outputs of said first and second amplifier means.

7. An automatic cross-over voltage/current regulated power supply as set forth in claim 1;

and including a source of reverse bias coupled to said control signal responsive means;

and a normally closed thermostat connected in series between said signal mixing point and said control signal responsive means.

8. An automatic cross-over voltage/current regulated power supply as set forth in claim 1;
   and including thermostat switch means for interrupting forward bias to said control signal responsive means and reverse bias means for cutting off said control signal responsive means upon opening of said thermostat switch.

9. An automatic cross-over voltage/current regulated power supply as set forth in claim 1;
   wherein said first and second unidirectional coupling means are semiconductor diodes.

10. An automatic cross-over voltage/current regulated power supply as set forth in claim 1;

wherein at least one of said amplifier means is an operational amplifier.

References Cited

UNITED STATES PATENTS

| | | |
|---|---|---|
| 3,138,752 | 6/1964 | De Blasio. |
| 3,303,411 | 2/1967 | Gately. |

LEE T. HIX, Primary Examiner

A. D. PELLINEN, Assistant Examiner

U.S. Cl. X.R.

317—33, 50; 323—22, 38